Aug. 11, 1931.  J. L. ARCHER  1,818,445
STERILIZER
Filed June 30, 1930

Inventor
J. L. Archer

By Clarence A. O'Brien
Attorney

Patented Aug. 11, 1931

1,818,445

UNITED STATES PATENT OFFICE

JOHN L. ARCHER, OF CAIRO, NEBRASKA

STERILIZER

Application filed June 30, 1930. Serial No. 464,966.

This invention relates generally to means for sterilizing tools and implements used by doctors, dentists, and barbers, and other similar tools requiring to be kept for use in a sterilized condition.

The invention relates particularly to a sterilizer for the use of barbers, and dentists, and others whereby they are supplied with an apparatus for conveniently sterilizing their instruments and supporting same in a position whereby they are drained of water and dried and the ordinary inconveniences attending washing said implements and tools are averted and done away with.

The main object of the invention is to provide an apparatus of this kind in convenient form, cheap to manufacture, not easily tipped over, and in every way admirably fitted for the purpose for which it is designed, providing an improvement over existing devices and constituting a contribution to the art relating thereto.

The particular embodiment selected for illustration in this application comprises a pot-like receptacle supported on legs having a wide circular base, the pot being provided with a handle, and a drain table for receiving and draining the water from the implements and to support them when taken out of the pot, and said drain table and the pot itself being provided each with a cover.

Referring to the drawings:—

Figure 1:
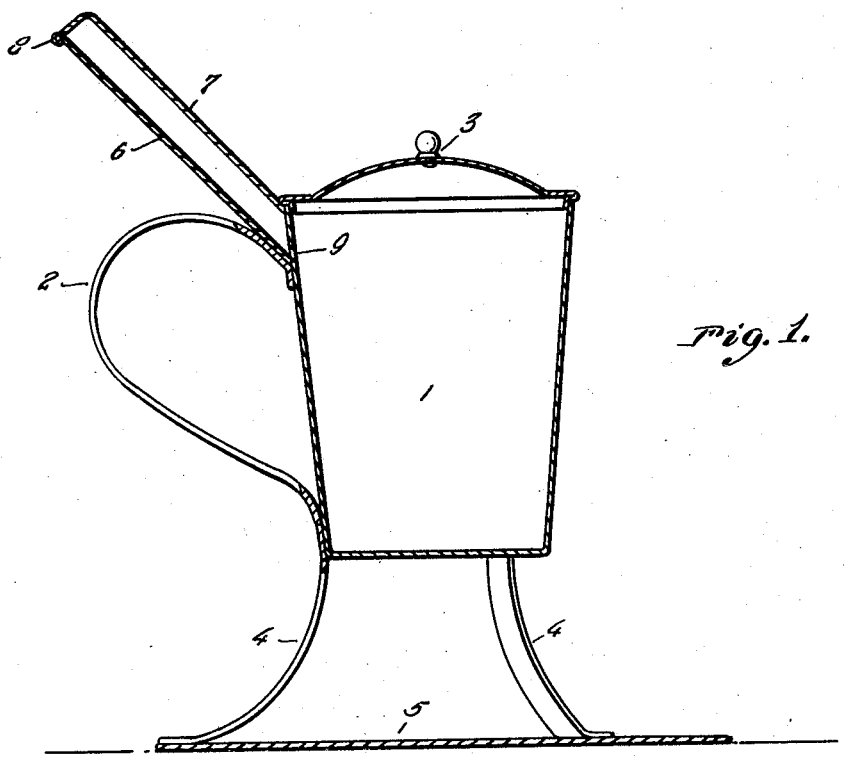
Figure 1 is a sectional elevational view of the device from one side.
Figure 2:
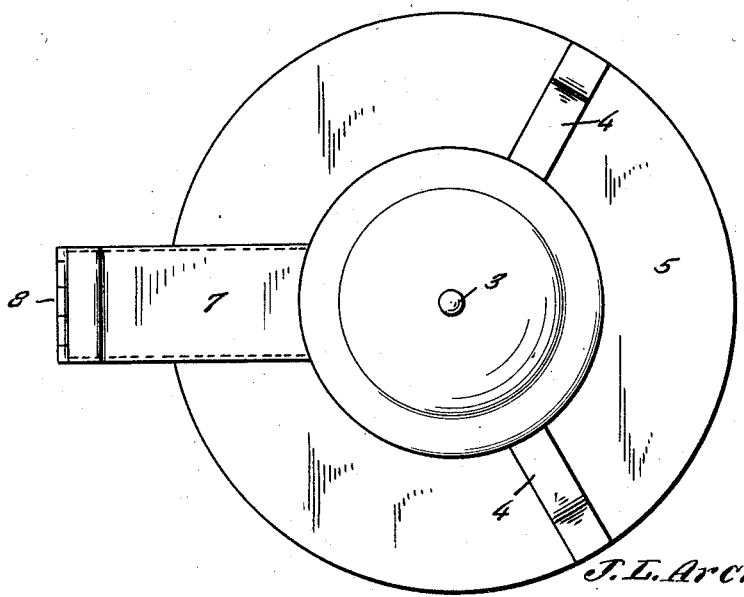
Fig. 2 is a top plan view of the device.

Referring in detail to the drawings:—A substantially cylindrical pot 1 is supported some distance above a base 5 by legs 4, thereby providing for the placing of a suitable heating element thereunder, said base being of substantially circular form. One of the legs 4 is extended upwardly in contact with the lower portion of the pot and is then outwardly and upwardly and then inwardly and downwardly curved into contact with the pot near the upper end thereof to form a handle 2 as shown in Figure 1. A covered trough or drain table 6 of channel form is attached to extend upwardly and outwardly at an angle from just below the upper end of the pot. The trough is communicated with the interior of the pot through holes 9 which permit the draining of fluid back into the pot, as when wet tools have been placed in the drain trough. Steam and heat also enter the holes 9 to dry whatever implements may be placed in the drain trough. As shown the drain trough is provided with a cover 7 hinged upon the upper end of the floor of the drain trough whereby to confine heat for quick drying of whatever instruments may be placed in the drain trough.

The cover 7 may be of any suitable formation and arranged so as not to be interfered with by the cover 3 of the pot.

From what has been taught, it will be evident that the sterilization of razors and other tools may be quickly, continuously and expeditiously accomplished. Sufficient heat reaches whatever instruments are placed in the draining trough to dry them in a very few moments, and the result of this condition is that such implements may be completely sterilized, and thoroughly dried and ready for use in a very few moments. Thus the time and trouble now consumed in washing, sterilizing and drying such implements with the aid of cloths, towels or other less sanitary objects is done away with, and at the same time the person using the tools or implements may occupy himself or herself in other operations, without being under the necessity to be in attendance upon the sterilizing process other than to remove the implements from the pot and place them in the draining trough.

It is also evident that this device may be cheaply constructed and that it fills a long felt want.

It is to be understood that the arrangement of the parts and the materials used and the embodiment illustrated herein may be modified to come within the scope of the invention.

Having thus described my invention, what I claim as new is:—

1. In a device of the kind described, a cup to contain the sterilizing liquid, peripherally spaced legs to support said cup and attached thereto at its bottom, a wide base to which the bottom of said legs are secured, a handle attached to one side of said pot, a drain tray above said handle partially supported by said handle and projecting from the upper edge of the pot at an angle of 45°, a cover for said drain tray hinged to the outer end of the tray, the lower end of said drain tray coinciding with a drain hole through the wall of the cup adjacent the point of attachment of the upper part of the handle.

2. In a device of the kind described, a wide flat base, a receptacle for sterilizing liquid, legs attached at peripherally spaced equal intervals to the base and to the bottom of the cup to support the same, a curved handle attached in coextension with one of the legs at one side of the cup, a drain tray partially supported by said handle on the cup above the handle and projecting outwardly and upwardly at an angle of 45°, a cover for said drain tray hinged at its outer end, said cup having a hole through its wall communicating with the drain tray, adjacent the point of attachment to the cup of the upper end of the handle.

3. In a device of the kind described, a flat base, legs rising from peripherally and uniformly spaced positions on said base, a cup like receptacle supported on said legs, a drain tray projecting outwardly and upwardly from the upper wall of said cup at an angle of 45°, a support for said drain tray comprising a curved handle attached to one side of the cup and abutting the lower end of said tray, a cover for said tray hinged at its outer end, the lower end of said drain tray communicating with a drain hole through the wall of the cup adjacent the upper end of the handle.

4. A sterilizer of the class described comprising a covered pot on legs, a plate to which the legs are attached, an extension on one of said legs forming a curvate looped handle whose upper end is attached to the side of the pot near the upper edge thereof, a straight shallow channel shaped trough extending upwardly and outwardly at an angle of 45 degrees just above the point of attachment of the upper end of the handle and supported by the handle, the lower end of the trough being in communication with interior of the pot through drain holes through the wall of the pot at the point of placement of the lower end of the trough, and a cover for the trough, said cover comprising an elongated plate adapted to rest its marginal portions on the upper edges of the sides of the trough, and an angular flange on the upper end of the plate for closing the upper end of the trough provided with a hinge connection with the upper end of the bottom of the trough.

In testimony whereof I affix my signature.

JOHN L. ARCHER.